United States Patent
Billington et al.

(10) Patent No.: US 10,343,061 B2
(45) Date of Patent: Jul. 9, 2019

(54) HAPTIC ACTUATORS HAVING MAGNETIC ELEMENTS AND AT LEAST ONE ELECTROMAGNET

(71) Applicant: Immersion Corporation, San Jose, CA (US)

(72) Inventors: Douglas Billington, Campbell, CA (US); William Rihn, San Jose, CA (US)

(73) Assignee: IMMERSION CORPORATION, San Jose, CA (US)

(*) Notice: Subject to any disclaimer, the term of this patent is extended or adjusted under 35 U.S.C. 154(b) by 86 days.

(21) Appl. No.: 15/450,923

(22) Filed: Mar. 6, 2017

(65) Prior Publication Data
US 2017/0173458 A1    Jun. 22, 2017

Related U.S. Application Data

(63) Continuation of application No. 14/580,177, filed on Dec. 22, 2014, now Pat. No. 9,589,432.

(51) Int. Cl.
| | |
|---|---|
| A63F 13/24 | (2014.01) |
| A63F 13/285 | (2014.01) |
| G06F 3/01 | (2006.01) |
| G08B 6/00 | (2006.01) |
| A63F 13/42 | (2014.01) |
| A63F 13/22 | (2014.01) |

(52) U.S. Cl.
CPC ............ *A63F 13/285* (2014.09); *A63F 13/22* (2014.09); *A63F 13/24* (2014.09); *A63F 13/42* (2014.09); *G06F 3/016* (2013.01); *G08B 6/00* (2013.01)

(58) Field of Classification Search
USPC ..................................................... 463/37, 38
See application file for complete search history.

(56) References Cited

U.S. PATENT DOCUMENTS

| | | |
|---|---|---|
| 3,128,999 A | 4/1964 | Schmitt |
| 4,556,130 A | 12/1985 | Puazakowski |
| 5,335,893 A | 8/1994 | Opp |

(Continued)

FOREIGN PATENT DOCUMENTS

| | | |
|---|---|---|
| CN | 101675411 A | 3/2010 |
| CN | 101803052 | 8/2010 |

(Continued)

OTHER PUBLICATIONS

First Office Action and Search Report issued by SIPO in CN Application No. 2013800088321, dated Oct. 29, 2014.

(Continued)

*Primary Examiner* — Pierre E Elisca
(74) *Attorney, Agent, or Firm* — Medler Ferro Woodhouse & Mills PLLC

(57) ABSTRACT

A wearable haptic-enabled user interface device comprising a plurality of magnetic elements and at least one electromagnet that are configured to generate a haptic effect at the user interface device by being disposed to generate at least one of an attractive force and a repelling force on each other when the at least one electromagnet is activated. The wearable haptic-enabled user interface device further comprises a processor configured to activate the at least one electromagnet in response to a determination to output the haptic effect.

24 Claims, 12 Drawing Sheets

(56) References Cited

U.S. PATENT DOCUMENTS

| | | |
|---|---|---|
| 5,419,626 A | 5/1995 | Crockett |
| 5,568,357 A | 10/1996 | Kochis et al. |
| 5,594,574 A | 1/1997 | Lara et al. |
| 5,751,551 A | 5/1998 | Hileman et al. |
| 5,765,819 A | 6/1998 | Hummel |
| 5,965,249 A | 10/1999 | Sutton et al. |
| 6,283,859 B1 * | 9/2001 | Carlson .................. B62D 5/006 188/267.1 |
| 6,744,903 B1 | 6/2004 | Jeon |
| 6,822,635 B2 | 11/2004 | Shahoian et al. |
| 6,879,318 B1 | 4/2005 | Chan et al. |
| 6,882,528 B2 | 4/2005 | Chuang |
| 6,975,305 B2 | 12/2005 | Yamashita |
| 7,267,313 B2 | 9/2007 | Krzoska et al. |
| 7,616,436 B2 | 11/2009 | DeMoss et al. |
| 7,633,745 B2 | 12/2009 | Sakakibara et al. |
| 7,835,147 B2 | 11/2010 | Merz et al. |
| 7,839,639 B2 | 11/2010 | Najbert |
| 8,059,105 B2 | 11/2011 | Rosenberg et al. |
| 8,061,673 B2 | 11/2011 | Yao |
| 8,068,337 B2 | 11/2011 | Yao et al. |
| 8,362,882 B2 | 1/2013 | Heubel et al. |
| 8,629,954 B2 | 1/2014 | Olien et al. |
| 9,174,134 B1 * | 11/2015 | Grant ...................... A63F 13/98 |
| 2002/0180712 A1 | 12/2002 | Sato et al. |
| 2003/0206202 A1 | 11/2003 | Moriya |
| 2004/0160422 A1 | 8/2004 | Choi et al. |
| 2006/0022952 A1 | 2/2006 | Ryynanen |
| 2006/0023416 A1 | 2/2006 | Chen |
| 2006/0109254 A1 | 5/2006 | Shinichiro |
| 2006/0181517 A1 | 8/2006 | Zadesky et al. |
| 2007/0298877 A1 | 12/2007 | Rosenberg |
| 2008/0055277 A1 | 3/2008 | Takenaka et al. |
| 2008/0060856 A1 | 3/2008 | Shahoian et al. |
| 2008/0111788 A1 | 5/2008 | Rosenberg et al. |
| 2008/0297328 A1 | 12/2008 | Crawford et al. |
| 2009/0015549 A1 | 1/2009 | Gelfond et al. |
| 2010/0045612 A1 | 2/2010 | Molne |
| 2010/0117809 A1 | 5/2010 | Dai et al. |
| 2010/0127140 A1 | 5/2010 | Smith |
| 2010/0172080 A1 | 7/2010 | Bestle |
| 2010/0245254 A1 | 9/2010 | Olien et al. |
| 2011/0032091 A1 | 2/2011 | Park et al. |
| 2011/0043454 A1 | 2/2011 | Modarres et al. |
| 2011/0053653 A1 | 3/2011 | Tho et al. |
| 2011/0080350 A1 | 4/2011 | Almalki et al. |
| 2011/0164365 A1 | 7/2011 | McClure et al. |
| 2011/0193824 A1 | 8/2011 | Modarres et al. |
| 2011/0227849 A1 | 9/2011 | Olien et al. |
| 2011/0248817 A1 | 10/2011 | Houston et al. |
| 2011/0291996 A1 | 12/2011 | Gao et al. |
| 2012/0206248 A1 | 8/2012 | Biggs |
| 2012/0319827 A1 | 12/2012 | Pance et al. |
| 2013/0044049 A1 | 2/2013 | Biggs et al. |
| 2013/0100607 A1 | 4/2013 | Ternus et al. |
| 2014/0028573 A1 | 1/2014 | Olien et al. |
| 2014/0125471 A1 | 5/2014 | Organ et al. |
| 2014/0175703 A1 | 6/2014 | Percival, Jr. |
| 2016/0011684 A1 | 1/2016 | Zhang |
| 2016/0129347 A1 * | 5/2016 | Grant .................... A63F 13/98 463/37 |
| 2016/0175703 A1 * | 6/2016 | Venkatesan ............. A63F 13/23 463/37 |

FOREIGN PATENT DOCUMENTS

| | | |
|---|---|---|
| CN | 102221889 | 10/2011 |
| CN | 202094851 | 12/2011 |
| DE | 200 19 074 U1 | 2/2001 |
| EP | 1 691 263 | 8/2006 |
| EP | 3 037 144 | 6/2016 |
| EP | 3 037 923 | 6/2016 |
| JP | 2006/048453 | 2/2006 |
| JP | 2012-108402 | 6/2012 |
| JP | 2016-119088 | 6/2016 |
| WO | 2004/081776 | 9/2004 |
| WO | 2010/0116962 | 10/2010 |
| WO | 2012/002664 | 1/2012 |
| WO | 2012/067370 | 5/2012 |
| WO | 2014/134962 | 9/2014 |

OTHER PUBLICATIONS

"Correlated Magnetics Research Programmable Magnetics," Correlated Magnetics Research, Apr. 1, 2014.

Extended European Search Report, issued in EP Application No. 15 192 075.8, dated Jun. 1, 2016.

Extended European Search Report, issued in EP Application No. 15198223.8, dated Apr. 21, 2016.

Notice of Allowance issued in U.S. Appl. No. 14/580,161, dated Dec. 14, 2016.

Notice of Allowance for U.S. Appl. No. 14/580,177, dated Oct. 21, 2016.

"Polymagnet Catalog—Correlated Magnetics," last accessed Aug. 19, 2015.

Communication Pursuant to Article 94(3) EPC issued Jul. 20, 2018 in corresponding European Patent Application No. 15 192 075.8.

* cited by examiner

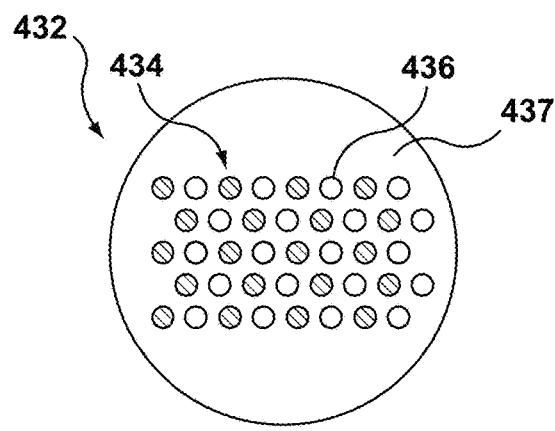
FIG. 6
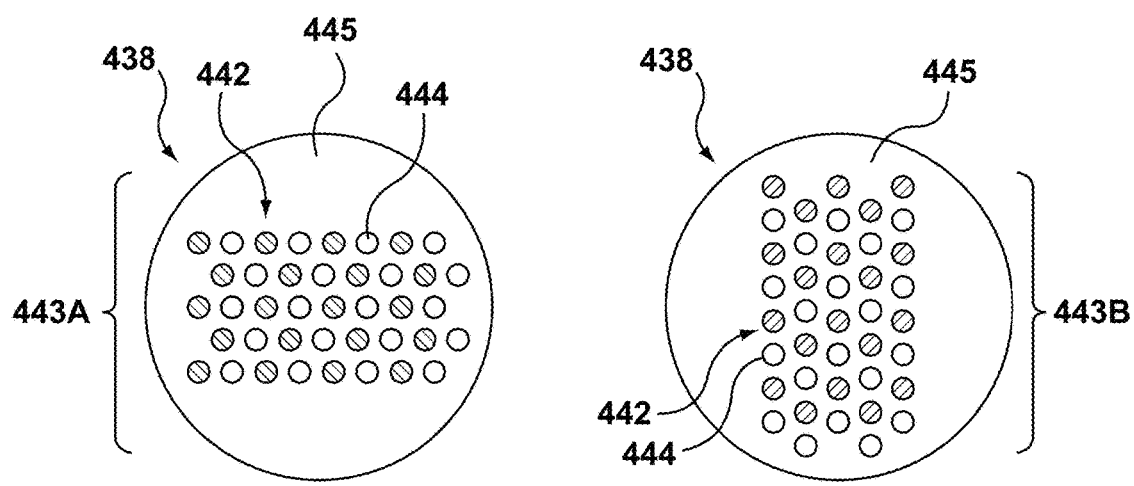
FIG. 7     FIG. 8

HAPTIC ACTUATORS HAVING MAGNETIC ELEMENTS AND AT LEAST ONE ELECTROMAGNET

CROSS REFERENCE TO RELATED APPLICATIONS

This application is a continuation of prior U.S. patent application Ser. No. 14/580,177, filed. Dec. 22, 2014, now U.S. Pat. No. 9,589,432, which is incorporated by reference herein in its entirety for ail purposes.

FIELD OF THE INVENTION

Embodiments hereof relate to a haptic-enabled user interface device having magnetic elements and at least one electromagnet that are configured to generate a haptic effect at the user interface device.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with a user input elements to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed devices to alert the user to specific events, or provide realistic feedback to user regarding interaction of the medical device with the patient at the distal end of the medical device.

Conventional haptic feedback systems for gaming and other devices generally include one or more actuators attached to the housing of the controller for generating the haptic feedback. However, these conventional haptic feedback systems create a haptic sensation along the entire body of the controller. Such a device does not provide a targeted or directed haptic sensation to the user for specific actions or locations. Embodiments hereof relate to a haptic feedback system that provides a haptic effect to the user input element that are discernible or distinguishable from general haptic effects produced along the entire body of the device/controller.

BRIEF SUMMARY OF THE INVENTION

Embodiments hereof are directed to a haptic-enabled user interface controller comprising a body, and a plurality of magnetic elements and at least one electromagnet that are coupled to the body and are configured to generate a haptic effect by being disposed to generate at least one of an attractive force and a repelling force on each other when the at least one electromagnet is activated. The controller further comprises a processor configured to activate the at least one electromagnet in response to a determination to output the haptic effect.

In an embodiment, when the at least one electromagnet is activated, the plurality of magnetic elements and the at least one electromagnet are configured to exert a force on each other that impedes motion of a portion of the controller.

Embodiments hereof relate to a wearable haptic-enabled user interface device comprising a plurality of magnetic elements and at least one electromagnet that are configured to generate a haptic effect at the user interface device by being disposed to generate at least one of an attractive force and a repelling force on each other when the at least one electromagnet is activated. The device further comprises a processor that is configured to activate the at least one electromagnet in response to a determination to output the haptic effect.

In an embodiment, the device is a glove.

In an embodiment, the plurality of magnetic elements are coupled to a first surface, and the at least one electromagnet is coupled to a second surface, and the first surface is spaced from the second surface.

In an embodiment, the first surface and the second surface are opposing surfaces.

In an embodiment, at least one magnetic element of the plurality of magnetic elements and the at least one electromagnet are disposed to face each other.

In an embodiment, the first surface is a deformable surface of the user interface device, and the plurality of magnetic elements are configured to deform the deformable surface when the at least one electromagnet is activated.

In an embodiment, the deformable surface is an outer surface of the user interface device.

In an embodiment, the plurality of magnetic elements and the at least one electromagnet are configured to output the haptic effect based on a simulated texture.

In an embodiment, the haptic effect that is output by the plurality of magnetic elements and the at least one electromagnet includes a vibration.

In an embodiment, the haptic effect that is output by the plurality of magnetic elements and the at least one electromagnet includes a detent.

In an embodiment, the plurality of magnetic elements and the at least one electromagnet are configured to output the haptic effect based on a simulated click of a button or trigger.

In an embodiment, when the at least one electromagnet is activated, the plurality of magnetic elements and the at least one electromagnet are configured to exert a force on each other that impedes motion of a portion of the user interface device.

In an embodiment, the plurality of magnetic elements have the same strength and polarity.

In an embodiment, at least two magnetic elements of the plurality of magnetic elements have different polarities or different magnetic strengths.

In an embodiment, the haptic effect is based on an event in a virtual environment.

In an embodiment, the interface device further comprises a position sensor. The processor is configured to detect a movement event based on data from the position sensor, and is configured to cause the haptic effect based on the movement event.

Embodiments hereof is directed to a deformable surface of an object, the deformable surface comprising a plurality of magnetic elements for deforming the surface. The plurality of magnetic elements are configured to experience a repelling force or an attractive force from at least one electromagnet. The plurality of magnetic elements are configured to change a shape of the deformable surface when the at least one electromagnet is activated to exert the attractive force or the repelling force on the plurality of magnetic elements.

In an embodiment, the at least one electromagnet with which the plurality of magnetic elements are configured to interact is disposed on a surface that is spaced from the deformable surface.

In an embodiment, the deformable surface is part of a wearable device.

In an embodiment, the surface comprises a first layer, and the plurality of magnetic elements are coupled to the first layer of the deformable surface.

Embodiments hereof are directed to a haptic peripheral including a housing, a user input element, and a magnetic actuator located within the housing and coupled to the user input element. The magnetic actuator includes a first programmable magnet attached to the user input element and a second programmable magnet disposed within the housing. The first and second programmable magnets each have a pre-programmed pattern of magnetic elements and the pre-programmed patterns of magnetic elements interact with each other to output haptic effects to the user input element. The pre-programmed pattern of magnetic elements of the second programmable magnet is movable relative to the pre-programmed pattern of magnetic elements of the first programmable magnet such that when the second programmable magnet is in a first configuration, a first haptic effect is output to the user input element and when the second programmable magnet is in a second configuration, a second haptic effect is output to the user input element, the first and second haptic effects being different from each other.

In an embodiment hereof, a motor is coupled to the second programmable magnet. The motor is configured to receive a haptic effect drive signal from a processor and is configured to re-position the pre-programmed pattern of magnetic elements of the second programmable magnet relative to the pre-programmed pattern of magnetic elements of the first programmable magnet in response to the haptic effect drive signal from the processor.

Embodiments hereof are also directed to a gaming system including a host computer, a processor, and a controller. The controller includes a housing, a user input element, and a magnetic actuator located within the housing and coupled to the user input element. The magnetic actuator includes a first programmable magnet attached to the user input element and a second programmable magnet disposed within the housing. The first and second programmable magnets each have a pre-programmed pattern of magnetic elements that interact to output haptic effects to the user input element. The pre-programmed pattern of magnetic elements of the second programmable magnet is movable relative to the pre-programmed pattern of magnetic elements of the first programmable magnet such that when the second programmable magnet is in a first configuration, a first haptic effect is output to the user input element and when the second programmable magnet is in a second configuration, a second haptic effect is output to the user input element, the first and second haptic effects being different from each other.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 6 is a top view of a first programmable magnet of the magnetic actuator for the button of the controller of FIG. 4.

FIG. 7 is a top view of a second programmable magnet of the magnetic actuator for the button of the controller of FIG. 4, wherein the second programmable magnet is in a first orientation or configuration.

FIG. 8 is a top view of a second programmable magnet of the magnetic actuator for the button of the controller of FIG. 4, wherein the second programmable magnet is in a second orientation or configuration.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other devices having user input elements.

Figure 1B:
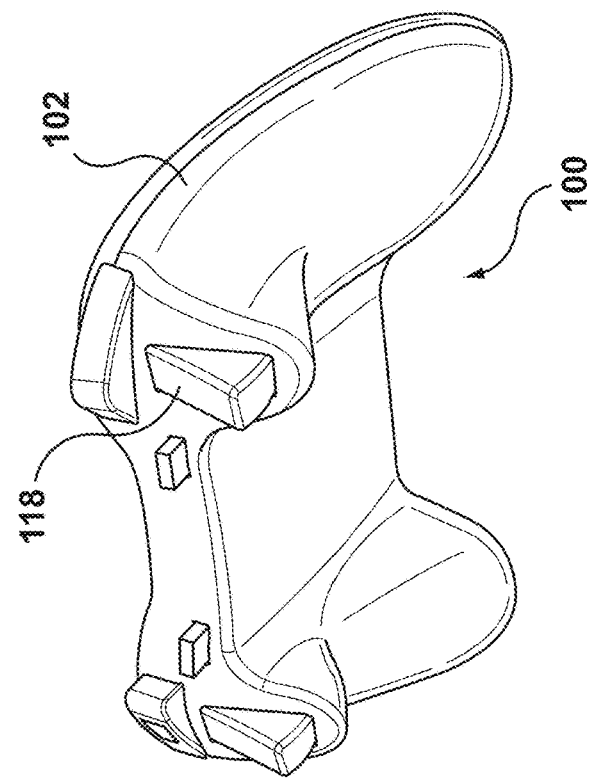
FIG. 1B is another perspective view of the controller of FIG. 1A.
Figure 1A:
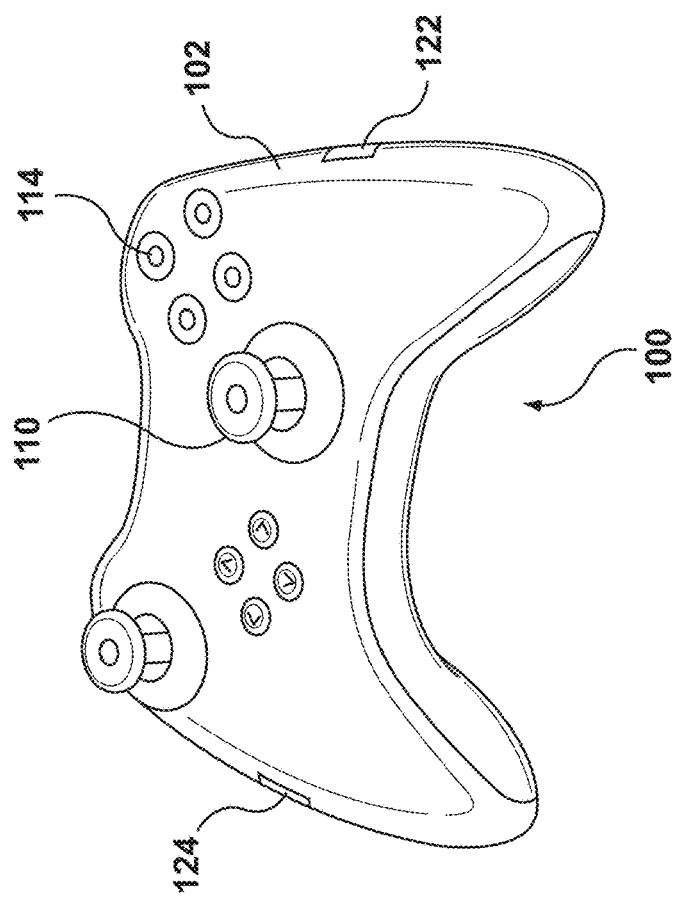
FIG. 1A is a perspective view of an embodiment of a controller.
Figure 3:
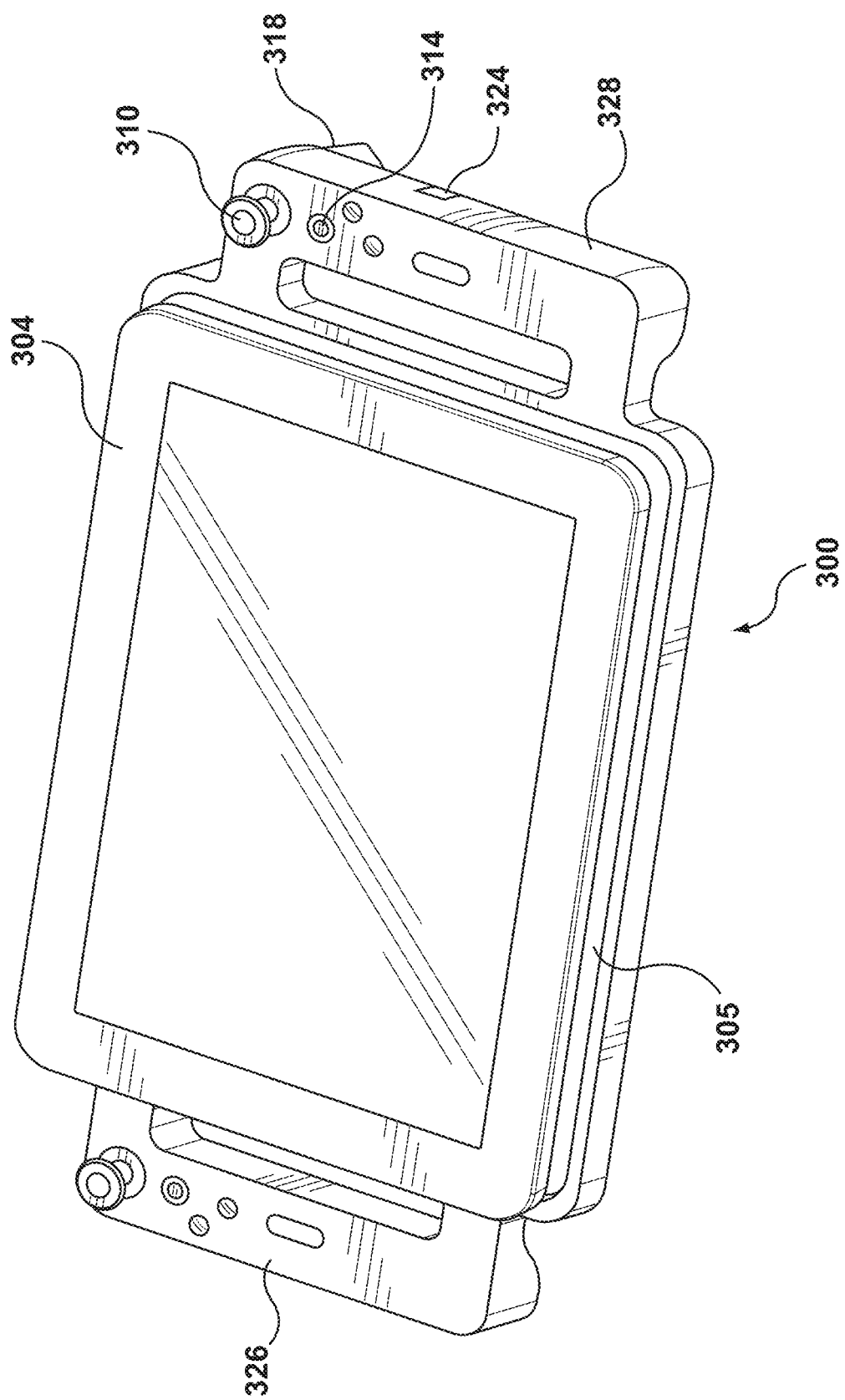
FIG. 3 is a perspective view of an embodiment of a gaming tablet.

Embodiments hereof relate to a haptic peripheral including a magnetic actuator coupled to a user input element for providing haptic effects directly to the user input element. The haptic peripheral may be, for example, a handheld gaming controller 100 for a gaming system as shown in FIGS. 1A-1B, a gaming tablet controller 300 as shown in FIG. 3, or other controllers that having user input (UI) elements such as, but not limited to, phones, personal digital assistants (PDA), tablets, computers, gaming peripherals, and other controllers for gaming systems known to those skilled in the art. Magnetic actuators according to embodiments hereof include at least two opposing programmable magnets with pre-programmed patterns to control the motion of the user input element. More particularly, magnetic actuators according to embodiments hereof include at least a first programmable magnet and a second or moving programmable magnet. Each programmable magnet has a pre-programmed pattern of magnetic elements affixed to a substrate. The pre-programmed patterns of magnetic elements of each programmable magnet interact with each other to cause haptic effects. In order to vary to haptic effects output by the magnetic actuator, the second or moving programmable magnet is spun, rotated, or otherwise moved to change the orientation of the pre-programmed pattern. The re-oriented pattern of the second programmable magnet changes the interaction between the first and second programmable magnets and thereby results in different haptic effects being output to the user input device. In an embodiment, a motor moves the second programmable magnet to vary the haptic effects.

Figure 2:
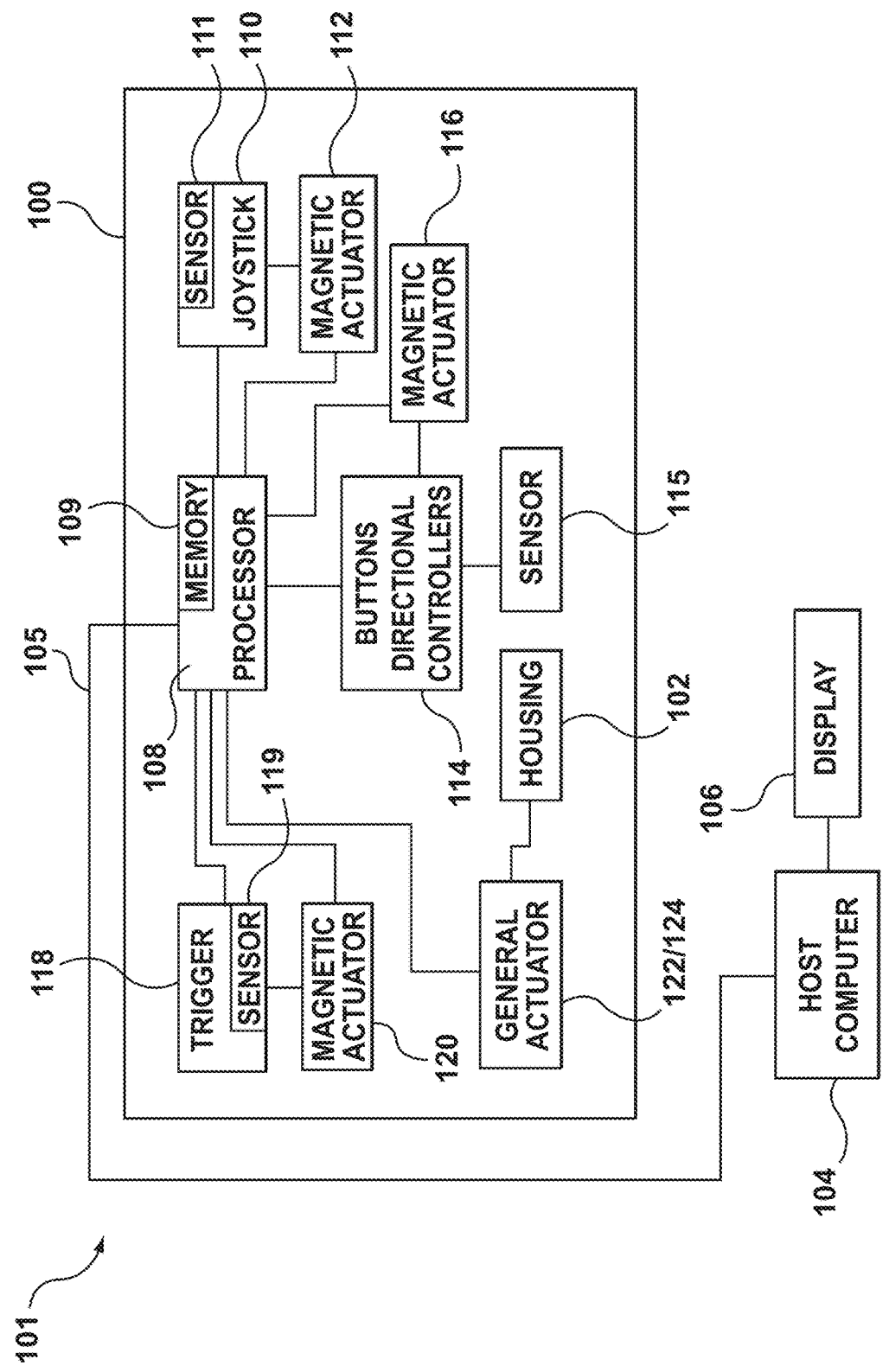
FIG. 2 is a block diagram of the controller of FIGS. 1A and 1B in conjunction with a host computer and display.

More particularly, turning to FIGS. 1A-1B, controller 100 may be generally used with a gaming system that may be connected to a computer, mobile phone, television, or other similar device. FIGS. 1A-1B illustrate different perspective views of controller 100, while FIG. 2 illustrates a block diagram of controller 100 used in a gaming system 101 that further includes a host computer 104 and a display 106. As shown in the block diagram of FIG. 2, controller 100 includes a local processor 108 which communicates with host computer 104 via a connection 105. Connection 105 may be a wired connection, a wireless connection, or other types of connections known to those skilled in the art. Controller 100 may be alternatively configured to not include local processor 108, whereby all input/output signals from controller 100 are handled and processed directly by host computer 104. Host computer 104 is coupled to display screen 106. In an embodiment, host computer 104 is a gaming device console and display screen 106 is a monitor which is coupled to the gaming device console, as known in the art. In another embodiment, as known to those skilled in the art, host computer 104 and display screen 106 may be combined into a single device.

A housing 102 of controller 100 is shaped to easily accommodate two hands gripping the device, either by a left-handed user or a right-handed user. Those skilled in the art would recognize that controller 100 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, as well as controllers shaped as real life objects (such as tennis rackets, golf clubs, baseball bats, and the like) and other shapes.

Controller 100 includes several user input elements or manipulandums, including a joystick 110, a button 114, and a trigger 118. As used herein, user input element refers to an interface device such as a trigger, button, joystick, or the like, which is manipulated by the user to interact with host computer 104. As can be seen in FIGS. 1A-1B and known to those skilled in the art, more than one of each user input element and additional user input elements may be included on controller 100. Accordingly, the present description of a button 114, for example, does not limit controller 100 to a single button. Further, the block diagram of FIG. 2 shows only one (1) of each of joystick 110, button 114, and trigger 118. However, those skilled in the art would understand that multiple joysticks, buttons, and triggers, as well as other user input elements, may be used as described above.

As can be seen in the block diagram of FIG. 2, controller 100 includes a magnetic actuator for providing haptic effect directly to user input elements thereof as well as one or more general or rumble actuators 122, 124 coupled to housing 102 in a location where a hand of the user is generally located. More particularly, joystick 110 includes a magnetic actuator 112 coupled thereto, button 114 includes a magnetic actuator 116 coupled thereto, and trigger 118 includes a magnetic actuator 120 coupled thereto. In addition to a plurality of magnetic actuators, controller 100 includes a position sensor coupled to each of the user input elements thereof. More particularly, joystick 110 includes a position sensor 111 coupled thereto, button 114 includes a position sensor 115 coupled thereto, and trigger 118 includes a position sensor 119 coupled thereto. Local processor 108 is coupled to magnetic actuators 112, 116, 120 as well as position sensors 111, 115, 119 of joystick 110, button 114, and trigger 118, respectively. Position sensors 111, 115, 119 are configured to detect a position of joystick 110, button 114, and trigger 118, respectively, and are configured to send the position to local processor 108. As will be described in more detail herein, in response to signals received from position sensors 111, 115, 119, local processor 108 instructs magnetic actuators 112, 116, 120 to provide haptic effects directly to joystick 110, button 114, and trigger 118, respectively. Such targeted haptic effects are discernible or distinguishable from general or rumble haptic effects produced by general actuators 122, 124 along the entire body of the controller. The collective haptic effects provide the user with a greater sense of immersion to the game as multiple modalities are being simultaneously engaged, e.g., video, audio, and haptics.

As noted above, position sensors 111, 115, 119 are configured to detect a position of joystick 110, button 114, and trigger 118, respectively. For example, position sensor 119 is configured to detect a change in the rotational position of trigger 118, position sensor 115 of button 114 is configured to detect linear motion or translation of button 114, i.e., when button 114 is pressed down, and position sensor 111 of joystick 110 is configured to detect motion of joystick 110 within one or more degrees of freedom, i.e., when joystick 110 is physically moved forward, backwards, left or right. In an embodiment, position sensors 111, 115, 119 are potentiometers but may be other types of position sensors known in the art such as but not limited to optical sensors, optical encoders, hall-effect sensors, capacitive sensors, strain gages, gyroscopes, accelerometers, audio receivers, and the like.

It will be appreciated that modifications and variations of controller 100 are covered by the above teachings and within the purview of the appended claims without departing from the spirit and intended scope of the invention. For example, FIGS. 1A-1B illustrate a haptic peripheral which is a hand-held gaming controller of similar shape and size to many "gamepads" currently available for video game console systems. However, those skilled in the art would recognize that the controller is merely an exemplary embodiment of a haptic peripheral and that haptic peripherals with other configurations, shapes, and sizes may be used. For example, FIG. 3 illustrates another embodiment hereof in which the haptic peripheral is a gaming tablet controller 300 that may be used with a tablet computer 304. Tablet computer 304 may be designed specifically for gaming activities, such as is available from Razer Inc., or may be a tablet computer well known and available in the market, such as an Apple® Ipad®, Kindle® Fire®, and Samsung® Galaxy Tab®.

Gaming tablet controller 300 includes a docking portion 305 configured to receive tablet computer 304 and handles 326, 328 with user input elements disposed thereon for a user to control a game on tablet computer 304. Docking portion 305 connects gaming tablet controller 300 to tablet computer 304 such that actions by the user on handles 326, 328 such as pressing buttons, moving joysticks, pressing triggers, etc., result in actions on the game being played on tablet computer 304.

Handles 326, 328 include typical user input elements found on controllers. The user input elements will be described with respect to handle 328. However, those skilled in the art would recognize that the same or similar user input elements may be used on handle 326. In particular, handle 328 includes a joystick 310, a button 314, and a trigger 318. As can be seen in FIG. 3 and known to those skilled in the art, more than one of each of these user input elements may be included on each handle 326, 328. Further, handle 328 includes a general or rumble actuator 324 attached thereto in a location where a hand of the user is generally located for providing general or rumble haptic effects to gaming tablet controller 300 as described above with respect to general or rumble actuators 122, 124.

Figure 4:
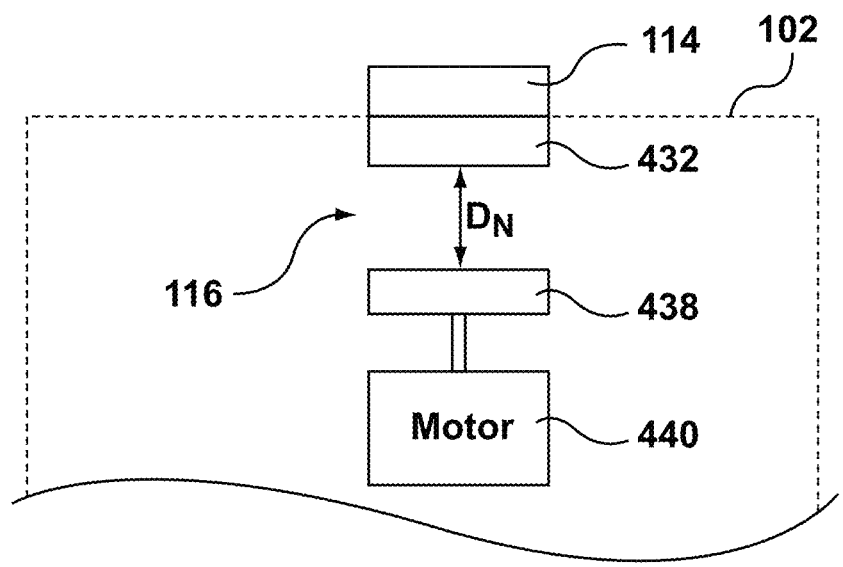
FIG. 4 is a side view of a portion of the controller of FIGS. 1A and 1B, wherein a housing of the controller is removed to illustrate the internal components thereof, in particular to illustrate a magnetic actuator for a button of the controller.
Figure 5B:
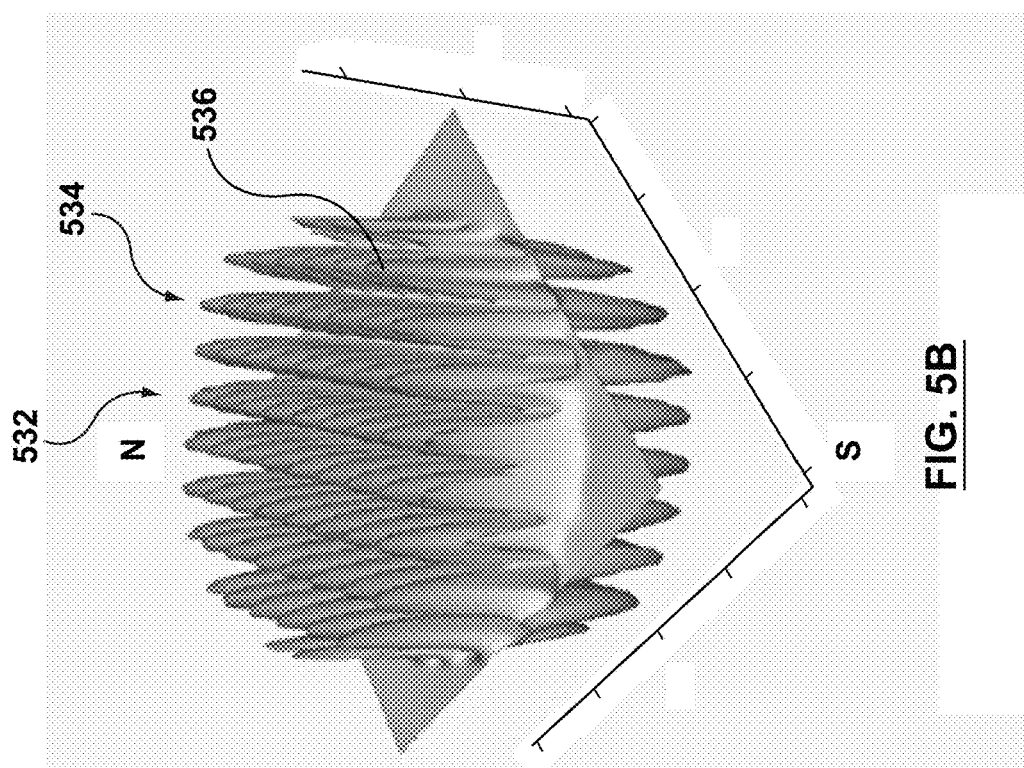
FIG. 5B is a perspective view of a programmable magnet.
Figure 5A:
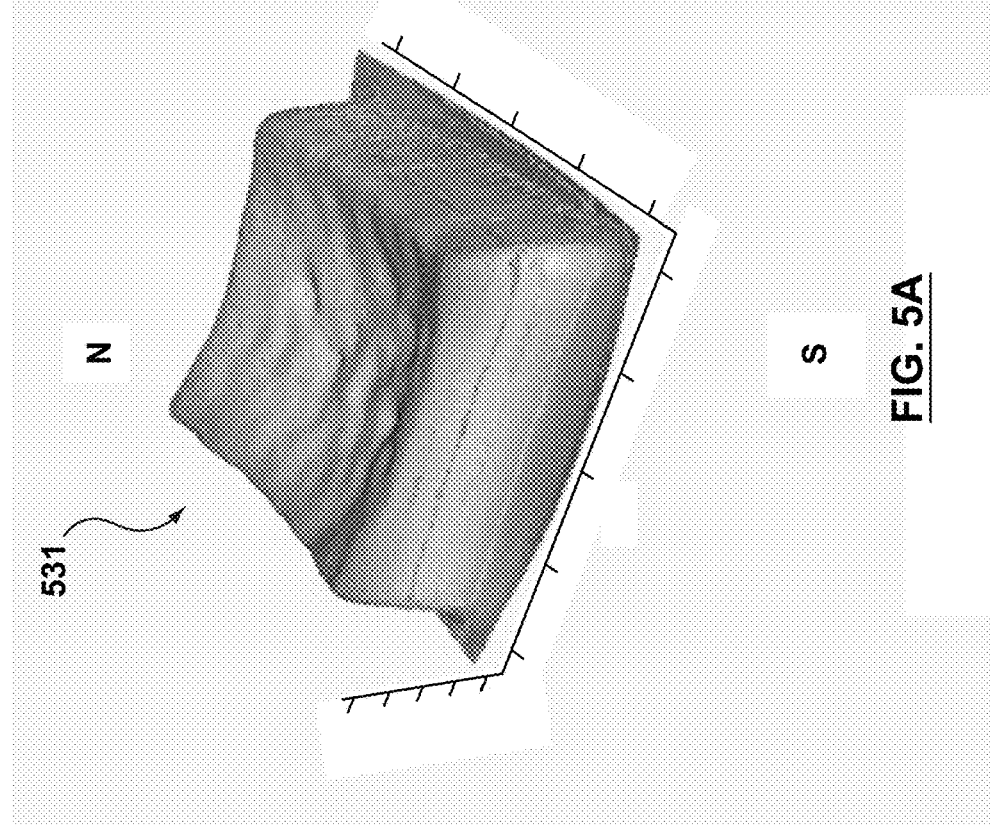
FIG. 5A is a perspective view of a conventional magnet.

Turning now to FIG. 4, which is a schematic illustration of a portion of controller 100 with housing 102 removed to illustrate the internal components thereof, magnetic actuator 116 for button 114 will be described in more detail. Although not shown, it will be understood by those of ordinary skill in the art that magnetic actuator 116 is positioned or housed within housing 102. Magnetic actuator 116 includes at least a first programmable magnet 432 secured to an underside surface of button 114 and a second or moving programmable magnet 438 positioned within housing 102. First and second programmable magnets 432, 438 are each programmable magnets including a pre-programmed pattern magnetic elements of various strength and polarity on a single substrate. As will be explained in more detail herein, the pre-programmed patterns of the magnetic elements of each programmable magnet interact with each other to cause haptic effects. More particularly, a conventional magnet 531 is shown in FIG. 5A while an exemplary programmable magnet 532 is shown in FIG. 5B. Conventional magnet 531 is a single or individual magnetic element having a singular polarity and strength, while programmable magnet 532 includes a plurality of magnetic elements 536 of various strength and polarity. When a pair of programmable magnets oppose or face each other such that the magnetic elements thereon oppose or face each other, the corresponding opposing magnetic elements form pre-programmed correlated patterns designed to achieve a desired behavior. The programmable behavior is achieved by creating multipole structures comprising multiple magnetic elements of varying size, location, orientation, and saturation. The exemplary embodiment of FIG. 5B illustrates a programmable magnet having a pre-programmed pattern 534 with sixty-six magnetic elements 536 on a single or individual surface or substrate, although the particular number of magnetic elements is exemplary and for use of illustration only and may be varied according to application. Each magnetic element 536 has the same strength and polarity in FIG. 5B, but the magnetic strength and polarity of any magnetic element 536 can each be varied to achieve a desired behavior. Thus, programmable magnets are programmable in the sense that the magnetic strength and polarity of any magnetic element 536 is designed or selected in order to achieve a desired behavior. However, the programmable aspect or nature of the magnet is complete after the programmable magnet is formed with a plurality of magnetic elements 536 of various strength and polarity, and thus the programmable magnets may be considered to be "one-time" programmable magnets. Programmable magnets are commercially available from Correlated Magnetics Research LLC of Huntsville, Ala.

As shown in FIG. 6, which is a top view of first programmable magnet 432 of magnetic actuator 116, first programmable magnet 432 includes a pre-programmed pattern 434 of magnetic elements 436 of various strength and polarity on a single substrate 437. Similarly, as shown in FIG. 7 which is a top view of second programmable magnet 438 of magnetic actuator 116, second programmable magnet 438 includes a pre-programmed pattern 442 of magnetic elements 444 of various strength and polarity on a single substrate 445. With additional reference to FIG. 4, via interaction between pre-programmed patterns 434, 442 of first and second programmable magnets 432, 438, respectively, the first and second programmable magnets are programmed to attract and repel each other at the same time with a programmed force or strength. By programming different magnetic elements to have different strengths and direction of poles at different parts of the magnet, first programmable magnet 432 and button 114 secured thereto are "suspended" magnetically above second programmable magnet 438 such that the programmable magnet 432 and button 114 secured thereto floats above second programmable magnet 438 with a programmed spring force or damping. More particularly, first programmable magnet 432 and button 114 secured thereto floats or hovers a controlled or programmed spaced-apart distance from second programmable magnet 438 in a nominal configuration. The nominal configuration of first and second programmable magnets 432, 438 is shown in FIG. 4, with first programmable magnet 432 and button 114 secured thereto being suspended a controlled or programmed distance DN from second programmable magnet 438. As used herein, controlled or programmed spaced-apart distance means that first programmable magnet 432 is located or disposed relative to second programmable magnet 438 such that a space or gap exists between the programmable magnets which do not contact or touch each other, and the measurement size of the distance is a programmable feature or characteristic of the programmable magnets. In addition, as used herein, nominal configuration is the relative positions or relationship between first and second programmable magnets 432, 438 when no force is applied to either component. Stated another way, the nominal configuration may be considered an equilibrium or zero-force state of first and second programmable magnets 432, 438.

Figure 9:
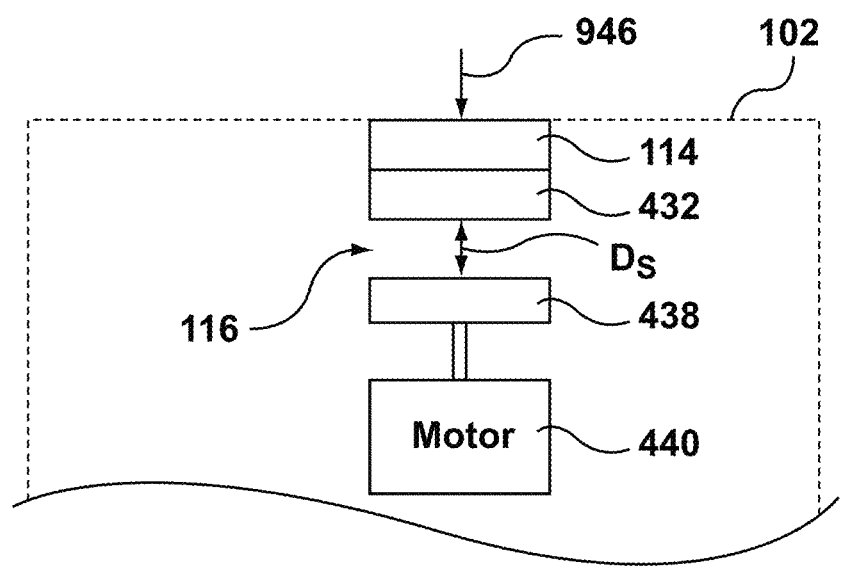
FIG. 9 is a side view of a portion of the controller of FIGS. 1A and 1B, wherein a downward force is applied to the button of the controller.

When a downward force as indicated by directional arrow 946 is applied to button 114, i.e., a user presses down on button 114 as shown in FIG. 9, first programmable magnet 432 and button 114 secured thereto are permitted to move relative to second programmable magnet 438 such that the distance between first programmable magnet 432 and second programmable magnet 438 is reduced or decreased to a shortened distance DS. Shortened distance DS is less than the controlled or programmed distance DN shown in the nominal configuration of FIG. 4. When no force is applied to button 114, i.e., a user releases button 114, first programmable magnet 432 and button 114 secured thereto return to the nominal configuration shown in FIG. 4 due to the controlled or programmed spring force of magnetic actuator 116.

Thus, in the nominal configuration of first and second programmable magnets 432, 438, the first and second programmable magnets are programmed with a controlled or programmed force or strength and a controlled or programmed spring force. Stated another way, in the nominal configuration of first and second programmable magnets 432, 438, the haptic effects output by magnetic actuator 116 include a programmed resistive force on button 114 as well as a programmed spring force of button 114. In order to vary or change the haptic effects output by magnetic actuator 116, second programmable magnet 438 is spun, rotated, or otherwise moved to change the orientation of pre-programmed pattern 442. The re-oriented pattern of second programmable magnet 438 changes the interaction between first and second programmable magnets 432, 438 and thereby results in different haptic effects being output to the user input device. More particularly, FIG. 7 illustrates a top view of second programmable magnet 438 in the first or nominal configuration 443A while FIG. 8 illustrates a top view of second programmable magnet 438 in a second or re-oriented configuration 443B. In the embodiment of FIGS. 7-8, only one re-oriented configuration is shown and second programmable magnet is spun or rotated approximately 180 degrees in order to alternate second programmable magnet 438 between the nominal and re-oriented configurations. However, it will be understood by those of ordinary skill in the art that the second programmable magnet may have multiple re-oriented configurations and may be rotated any predetermined amount of degrees. For example, in another embodiment (not shown), second programmable magnet 438 has three re-oriented configurations and is rotated approximately 90 degrees to change into an adjacent re-oriented configuration.

In the embodiment of FIGS. 7-8, a motor 440 moves second programmable magnet 438 between nominal and re-oriented configurations 443A, 443B. More particularly, motor 440 is configured to receive a haptic effect drive signal from processor 108 and is configured to re-position the pre-programmed pattern 442 of second programmable magnet 438 relative to pre-programmed pattern 434 of first programmable magnet 432 in response to the haptic effect drive signal from the processor. Motor 440 is a bidirectional motor that may spin second programmable magnet 438 in opposing directions, i.e., clockwise or counter clockwise. In an embodiment, motor 440 is a DC permanent magnet motor but may be other types of brushless DC motors, stepper motors, or solenoids known and available in the art.

When second programmable magnet 438 is moved between nominal and re-oriented configurations 443A, 443B, the haptic effects output by magnetic actuator 116 are varied or changed because the interaction between first and second programmable magnets changes and results in a different programmed resistive force on button 114 as well as a different programmed spring force of button 114. Stated another way, pre-programmed pattern 442 of second programmable magnet 438 is movable relative to pre-programmed pattern 434 of first programmable magnet 432 such that when second programmable magnet 438 is in a first or nominal configuration 443A, a first haptic effect is output to button 114 and when second programmable magnet 438 is in a second or re-oriented configuration 443B, a second haptic effect is output to button 114, the first and second haptic effects being different from each other. For example, when second programmable magnet 438 is in re-oriented configuration 443B, the first and second programmable magnets are programmed with a controlled or programmed force or strength and a controlled or programmed spring force that are different from the strength and spring force of first and second programmable magnets 432, 438 when in nominal configuration 443A. The applied resistive force against button 114 may be increased or decreased, as well as the spring force of button 114. In an embodiment hereof, magnetic actuator 116 may output a maximum resistive force which impedes all user motion in a lock-out mode of button 114.

Further, in addition to a resistive force and spring force variations, a wide variety of haptic effects or sensations may be output to button 114 since second programmable magnet 438 is movable relative to first programmable magnet 432. More particularly, magnetic actuator 116 may output a detent on button 114 by outputting a resistive force on button 114 which is removed at one or more particular button positions or locations. As such, the detent felt by the user resembles a button click. In another embodiment, magnetic actuator 116 may output texture feedback by outputting a variable or changing frequency drive onto button 114 at one or more particular button positions or locations. More particularly, texture feedback is determined or generated by varying the frequency, shape, and size of the programmed magnetic configurations. For gradual force changes, a pattern may be lines of magnetic strength that vary from stronger to weaker on both programmable magnets. For example, pressing button 114 may slide one programmable magnet across the other, causing the stronger magnetic fields to come into contact at certain points of maximum force. In yet another embodiment hereof, magnetic actuator 116 may output a vibration on button 114 by rapidly spinning second programmable magnet 438 back and forth or by rapidly changing rotation directions using a motor (angular motion) or a solenoid (linear motion). More particularly, the frequency of vibrational feedback is determined or generated by the size, frequency of programmed magnetic areas, and speed of the motor. For example, a circular disk with 3 large programmable areas that spins at 60 RPM would have a lower operating frequency than a disk with more programmable areas and/or a faster motor.

In an embodiment hereof, movement of second programmable magnet 438 is initiated via detection of a movement event by position sensor 115. More particularly, in operation, local processor 108 (not shown in FIG. 4) detects or receives button positions and/or movement events from position sensor 115 and sends the button positions and/or movement events to host computer 104. As an example, a user may depress or press down on button 114 in order to fire a weapon in a shooting game example or to accelerate a car in a racing video game example. One of ordinary skill in the art would understand that movement events of button 114 are not limited to the examples stated above. Based on the movement event, local processor 108 then provides associated haptic effect drive signals to magnetic actuator 116 (via motor 440) based on high level supervisory or streaming commands from host computer 104. For example, when in operation, voltage magnitudes and durations are streamed from host computer 104 to controller 100 where information is provided to motor 440 via local processor 108. Host computer 104 may provide high level commands to local processor 108 such as the type of haptic effect to be output (e.g. vibration, jolt, detent, pop, etc.) by magnetic actuator 116, whereby the local processor 108 instructs magnetic actuator 116 (via motor 440) as to particular characteristics of the haptic effect which is to be output (e.g. magnitude, frequency, duration, etc.). Local processor 108 may retrieve the type, magnitude, frequency, duration, or other characteristics of the haptic effect from a memory 109 coupled thereto (shown in the block diagram of FIG. 2). Motor 440 receives the haptic effect drive signal from local processor 108, and then motor 440 moves second programmable magnet 438 to a particular orientation in order to output a particular haptic effect to button 114 in response to the haptic effect drive signal from local processor 108. In an embodiment, the functionality of the above-described operation is implemented by software stored in the memory of host computer 104 and executed by processor of host computer 104, and/or memory 109 of controller 100 and executed by local processor 108 of controller 100. In other embodiments, the functionality may be performed by hardware through the use of an application specific integrated circuit ("ASIC"), a programmable gate array ("PGA"), a field programmable gate array ("FPGA"), or any combination of hardware and software.

Different button positions and movement events may result in different haptic effects being applied by magnetic actuator 116. For example, a first position of button 114 results in magnetic actuator 116 generating and applying a first haptic effect drive signal to button 114, while a second position of button 114 results in magnetic actuator 116 generating and applying a second haptic effect drive signal to button 114. Stated another way, pressing button 114 may result in a change of the orientation of second programmable magnet 438. More particularly, depending on game actions and the position of button 114 as indicated by position sensor 115, local processor 108 may send a haptic effect drive signal to motor 440 to move second programmable magnet 438 to a particular orientation in order to output one of a wide variety of haptic effects or sensations, including vibrations, detents, textures, jolts or pops. Further, the strength or level of the haptic effect or sensation may vary depending on the position of button 114 as indicated by position sensor 115.

In another embodiment, detection of a movement event is not required for producing a haptic effect drive signal from the host computer system and movement of second programmable magnet 438 is initiated based on programming of the host computer system. Stated another way, the host computer system may generate and transmit a haptic effect drive signal to controller 100 without detection of a movement event. For example, the host computer system may generate and transmit a haptic effect drive signal to controller 100 based on events relating to the computer controlled character or object (i.e., the character's hand is bumped or hit by something in the video game and a haptic effect is output to the user input element to signify this event).

Figure 10A:
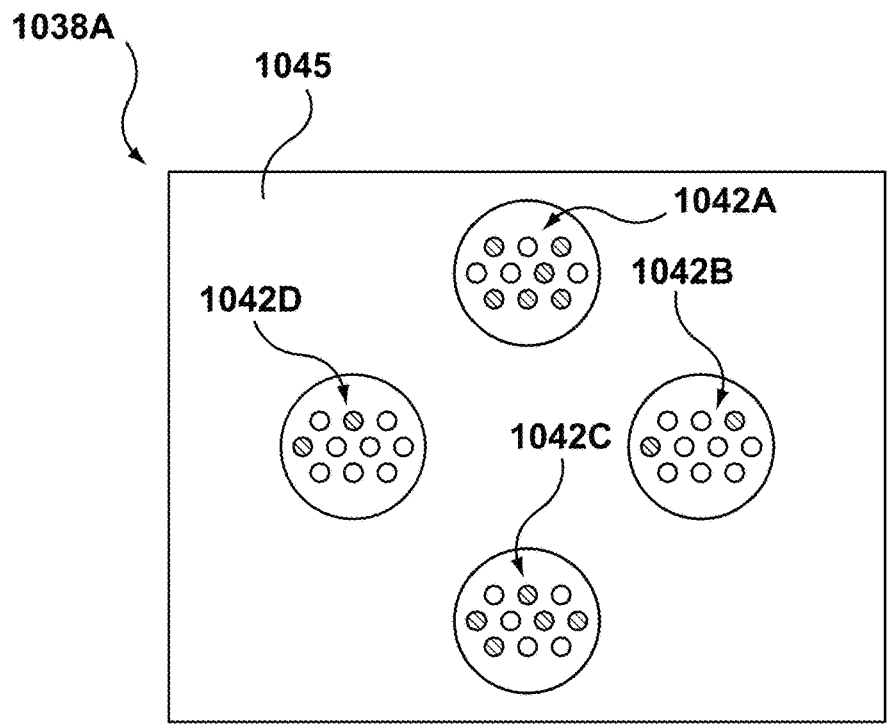
FIG. 10A is a top view of a second programmable magnet of a magnetic actuator according to another embodiment hereof, wherein the second programmable magnet includes an array of magnets.
Figure 10B:
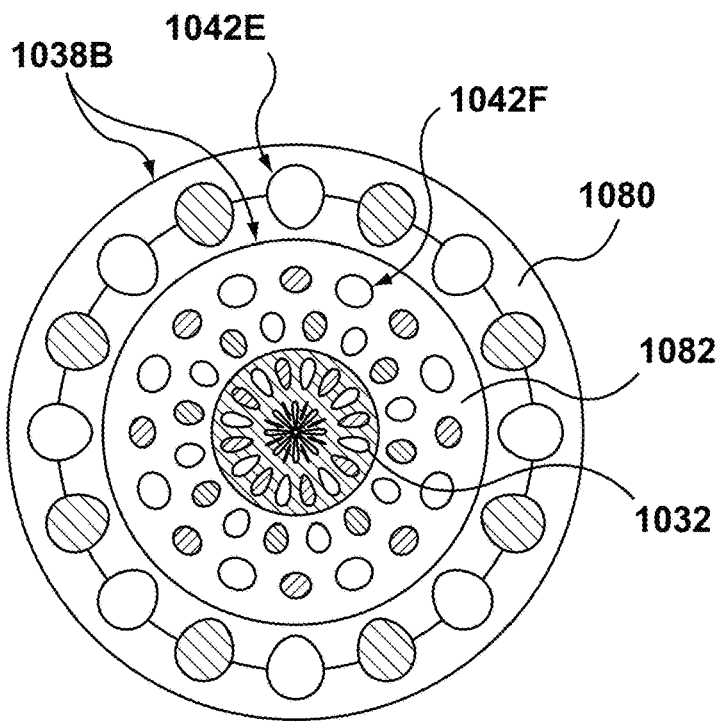
FIG. 10B is a cross-sectional view of a second programmable magnet of a magnetic actuator according to another embodiment hereof, wherein the second programmable magnet includes concentric rings that may be independently rotated relative to each other.

As described herein, second programmable magnet 438 is rotated or spun in order to re-orient the pre-programmed pattern of magnetic elements thereof in order to minimize the overall physical size thereof. However, the size of the second programmable magnet may be increased such that additional magnetic elements are included thereon and the second programmable magnet may be moved in order to selectively position particular magnetic elements thereof in opposition with a first programmable magnet, such as first programmable magnet 432. For example, in another embodiment shown in FIG. 10A, a second programmable magnet 1038A includes an array of pre-programmed patterns 1042A, 1042B, 1042C, 1042D on a substrate 1045. Second programmable magnet 1038A may be spun or rotated in order to position a particular pre-programmed pattern in opposition with a first programmable magnet, such as first programmable magnet 432 (not shown in FIG. 10A), in order to output varying haptic effects. In another embodiment, substrate 1045 may remain stationary and each pre-programmed pattern 1042A, 1042B, 1042C, 1042D may be located on a moving plate in order to output varying haptic effects. Further, additional array configurations may be utilized. For example, rather than having an array of pre-programmed patterns as shown in FIG. 10, the magnetic elements may form a continuous ring. Another example is depicted in FIG. 10B. More particularly, a second programmable magnet 1038B includes two concentric annular substrates 1080, 1082 that are disposed around a center first programmable magnet 1032. Each annular substrate 1080, 1082 includes a pre-programmed pattern 1042E, 1042F of magnetic elements that may be spun or rotated in order to re-orient the pre-programmed pattern thereof relative to first programmable magnet 1032 in order to output varying haptic effects. Stated another way, first programmable magnet 1032 remains stationary while annular substrates 1080, 1082 are independently or selectively rotated or spun around in order to output varying haptic effects.

Figure 11:
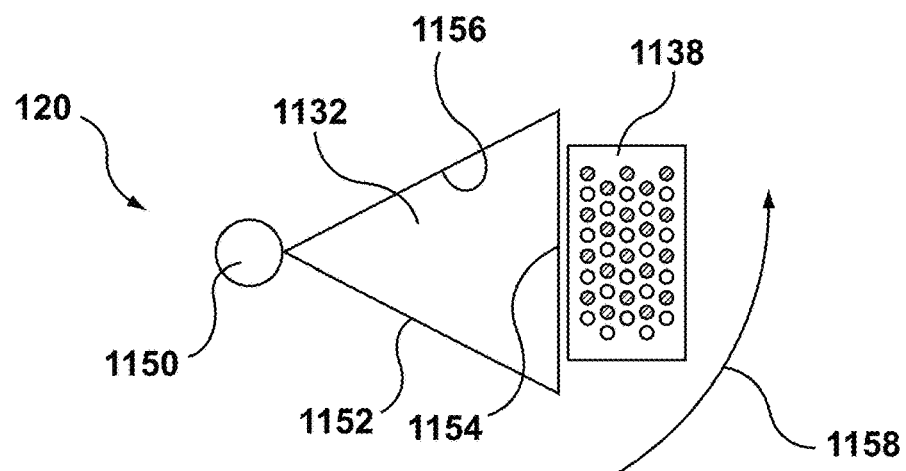
FIG. 11 is a side view of a magnetic actuator to be utilized for actuating the trigger of the controller of FIGS. 1A and 1B according to another embodiment hereof.

Turning now to FIG. 11, magnetic actuator 120 for trigger 118 for use within controller 100 will be described. Each magnetic actuator 120 includes a first programmable magnet 1132 (which when assembled is attached to trigger 118 as will be described in more detail with respect to FIGS. 12-13) and a second programmable magnet 1138 (which when assembled is a moving part housed within controller 100 and coupled to a motor as will be described in more detail with respect to FIGS. 12-13). First and second programmable magnets 1132, 1138 are each programmable magnets including multiple magnetic elements of various strength and polarity on a single substrate. First programmable magnet 1132 has a triangular cross-section defining a base side or surface 1154, as well as two opposing angular surfaces 1152, 1156. As trigger 118 is operated, first programmable magnet 1132 rotates or pivots around a pivot point 1150, which is formed between opposing angular surfaces 1152, 1156 thereof, as indicated by directional arrow 1158 shown on FIG. 11.

Figure 12:
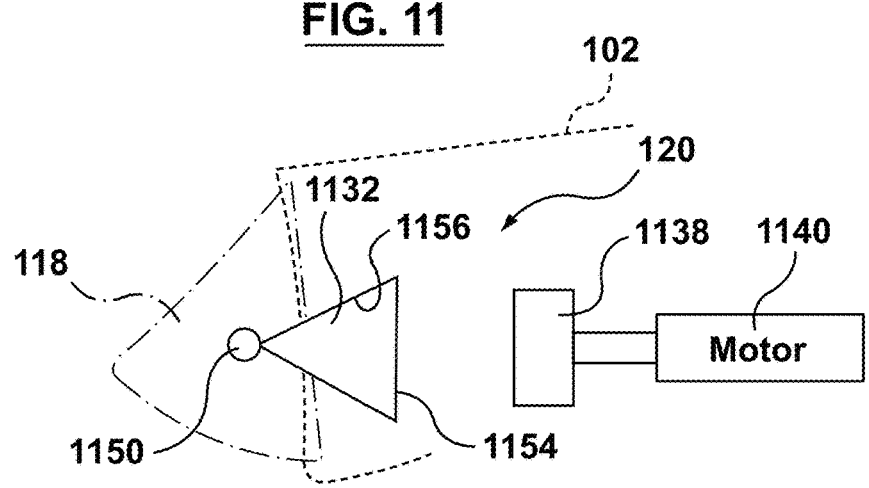
FIG. 12 is a side view of the magnetic actuator of FIG. 11 utilized with the trigger of the controller of FIGS. 1A and 1B, wherein the trigger is shown in its nominal configuration with no force applied thereto.
Figure 13:
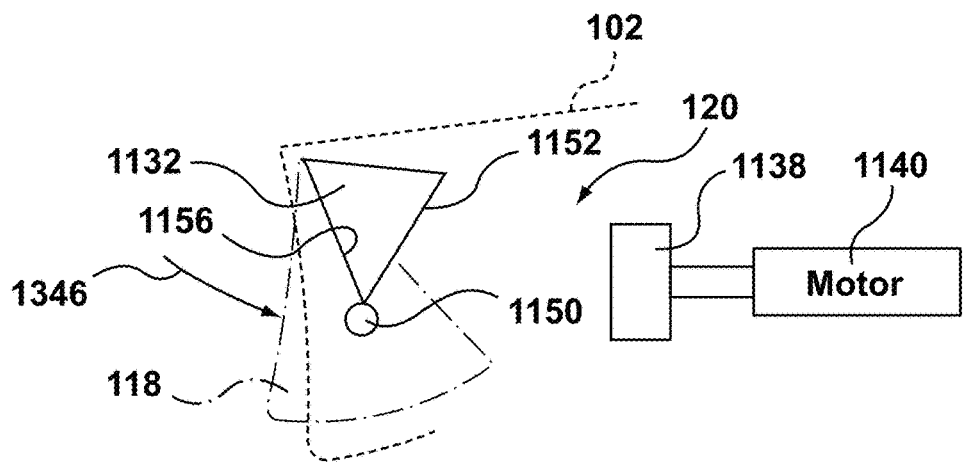
FIG. 13 is a side view of the magnetic actuator of FIG. 11 utilized with the trigger of the controller of FIGS. 1A and 1B, wherein a downward force is applied to the trigger.

When magnetic actuator 120 is utilized within controller 100, first programmable magnet 1132 is attached to trigger 118 as shown FIGS. 12-13 and second programmable magnet 1138 is housed or positioned within controller 100 and coupled to a motor 1140. FIGS. 12-13 are schematic illustrations of a portion of controller 100 with housing 102 removed (a portion of housing 102 is shown in phantom) to illustrate the structural relationship between trigger 100 and magnetic actuator 120. FIG. 12 illustrates a nominal configuration of magnetic actuator 120 and trigger 118 in which no force is applied to trigger 118. Trigger 118 protrudes or extends away from housing 102, and base surface 1154 of first programmable magnet 1132 faces or opposes second programmable magnet 1138. Base surface 1154 of first programmable magnet 1132 and second programmable magnet 1138 are programmed to attract and repel each other with a prescribed force at the same time such that trigger 100 may be magnetically "suspended" in the nominal configuration with trigger 100 protruding or extending away from housing 102 with a programmed spring force or damping. As such, magnetic actuator 120 in accordance with embodiments hereof are configured to or programmed such that first programmable magnet 1132 (and trigger 118 attached thereto) protrudes or extends away a controlled or programmed spaced-apart distance from second programmable magnet 1138.

When a downward force is applied to trigger 118 as indicated by directional arrow 1346 on FIG. 13, trigger 118 and first programmable magnet 1132 attached thereto rotate or pivot around pivot point 1150 until angular surface 1152 of first programmable magnet 1132 faces or is adjacent to second programmable magnet 1138 as shown in FIG. 13. The downward force applied to trigger 118 is user-applied (e.g., trigger 118 is manually rotated with respect to housing 102 and the trigger is operated by the user during video game operation to input user action). Angular surface 1152 and/or angular surface 1156 of first programmable magnet 1132 are programmed to attract second programmable magnet 1138. When the downward force represented by directional arrow 1346 is removed from trigger 118, the attraction force between angular surface 1152 and/or angular surface 1156 of first programmable magnet 1132 and second programmable magnet 1138 causes first programmable magnet 1132 (and trigger 118 attached thereto) to move towards second programmable magnet 1138, thereby causing first programmable magnet 1132 (and trigger 118 attached thereto) to return to their nominal configuration shown in FIG. 12. The attraction force between angular surface 1152 and/or angular surface 1156 of first programmable magnet 1132 and second programmable magnet 1138 thus essentially is a controlled or programmed spring force such that trigger 118 returns to the nominal configuration when no force is applied thereto.

Thus, in the nominal configuration of first and second programmable magnets 1132, 1138, the first and second programmable magnets are programmed with a controlled or programmed force or strength and a controlled or programmed spring force. Stated another way, in the nominal configuration of first and second programmable magnets 1132, 1138, the haptic effects output by magnetic actuator 120 include a programmed resistive force on trigger 118 as well as a programmed spring force of trigger 118. In order to vary or change the haptic effects output by magnetic actuator 120, second programmable magnet 1138 is spun, rotated, or otherwise moved by motor 1140 to change the orientation of the pre-programmed pattern thereof. The re-oriented pattern of second programmable magnet 1138 changes the interaction between first and second programmable magnets 1132, 1138 and thereby results in different haptic effects being output to the user input device as described above with respect to first and second programmable magnets 432, 438, respectively. Motor 1140 is a bidirectional motor similar to motor 440 described above.

When second programmable magnet 1138 is moved between the nominal and re-oriented configurations, the haptic effects output by magnetic actuator 120 are varied or changed because the interaction between first and second programmable magnets changes and results in a different programmed resistive force on trigger 118 as well as a different programmed spring force of trigger. Stated another way, the pre-programmed pattern of second programmable magnet 1138 is movable relative to the pre-programmed pattern of first programmable magnet 1132 such that when second programmable magnet 1138 is in a first or nominal configuration, a first haptic effect is output to trigger 118 and when second programmable magnet 1138 is in a second or re-oriented configuration, a second haptic effect is output to trigger 118, the first and second haptic effects being different from each other. For example, when second programmable magnet 1138 is in a re-oriented configuration, the first and second programmable magnets are programmed with a controlled or programmed force or strength and a controlled or programmed spring force that are different from the strength and spring force of first and second programmable magnets 1132, 1138 when in the nominal configuration. The applied resistive force against trigger 118 may be increased or decreased, as well as the spring force of trigger 118. In an embodiment hereof, magnetic actuator 120 may output a maximum resistive force which impedes all user motion in a lock-out mode of trigger 118.

Further, in addition to a resistive force and spring force variations, a wide variety of haptic effects or sensations may be output to trigger 118 since second programmable magnet 1138 is movable relative to first programmable magnet 1132. More particularly, magnetic actuator 120 may output a detent on trigger 118 by outputting a resistive force on trigger 118 which is removed at one or more particular trigger positions or locations. As such, the detent felt by the user resembles a trigger click. In another embodiment, magnetic actuator 120 may output texture feedback by outputting a variable or changing resistive force on trigger 118 at one or more particular button positions or locations. In yet another embodiment hereof, magnetic actuator 120 may output a vibration on trigger 118 by rapidly spinning second programmable magnet 1138 back and forth.

In an embodiment hereof, movement of second programmable magnet 1138 is initiated via detection of a movement event by position sensor 119, as described above with movement of second programmable magnet 438 and position sensor 115. In another embodiment hereof, detection of a movement event is not required for producing a haptic effect drive signal from the host computer system and movement of second programmable magnet 1138 is initiated based on programming of the host computer system.

As described herein, first and second programmable magnets 1132, 1138 are configured to provide both a programmed spring force as well as output varied haptic effects when second programmable magnet 1138 is spun, rotated, or otherwise moved by motor 1140 to change the orientation of the pre-programmed pattern thereof. Depending upon the pre-programmed pattern thereof, the programmed spring force may remain the same as second programmable magnet 1138 is spun, rotated, or otherwise moved by motor 1140 (and thus the spring force is not a variable haptic effect) or the programmed spring force may vary as second programmable magnet 1138 is spun, rotated, or otherwise moved by motor 1140 (and thus the spring force is a variable haptic effect). However, in another embodiment hereof (not shown), two pairs or sets of programmable magnets may be provided that are independently configured to provide these functions. More particularly, a first pair or set of programmable magnets may be configured to provide a non-varying programmed spring force or suspension of trigger 118 as described in U.S. patent application Ser. No. 14/580,161, filed the same day as the present application, assigned to the same assignee as the present application and having common inventors with the present application. A second pair or set of programmable magnets may be configured to provide or output varied haptic effects when one of the programmable magnets is spun, rotated, or otherwise moved to change the orientation of the pre-programmed pattern thereof. In another embodiment hereof (not shown), only one first programmable magnet may be provided on the trigger while two second programmable magnets, one of which is configured to be moved and the other of which is stationary or non-moving, are provided within the housing. The first programmable magnet on the trigger is configured to interact with the stationary second programmable magnet to provide a non-varying programmed spring force or suspension of the trigger, while the first programmable magnet on the trigger is configured to interact with the moving second programmable magnet to provide or output varied haptic effects when the moving second programmable magnet is spun, rotated, or otherwise moved to change the orientation of the pre-programmed pattern thereof.

Further, as described herein, first programmable magnet 1132 has a triangular cross-section and first programmable magnet 1132 rotates or pivots around a pivot point during operation of trigger 118. However, alternative configurations may be utilized. For example, in another embodiment hereof (not shown), first programmable magnet 1132 may be an armature that holds a pre-programmed disc-shaped magnet configured to spin on the X, Y, and/or Z axis.

Figure 14:
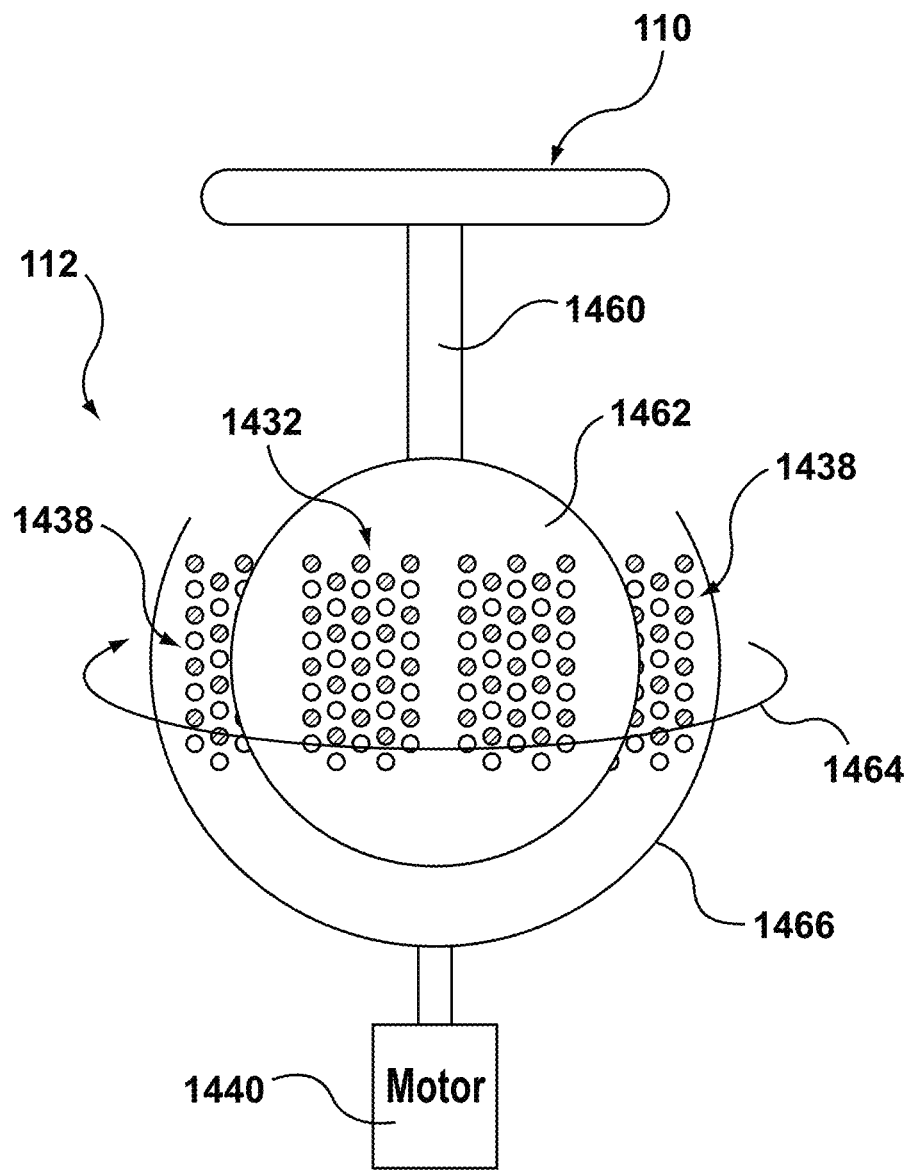
FIG. 14 is a side view of a magnetic actuator utilized for actuating a joystick of the controller of FIGS. 1A and 1B according to another embodiment hereof, wherein the joystick is shown in its nominal configuration with no force applied thereto.

Turning now to FIG. 14, magnetic actuator 112 for joystick 110 for use within controller 100 will be described. Joystick 110 includes a base 1462 and a handle 1460 extending from base 1462. Base 1462 has a spherical configuration and is configured to rotate within a spherical casing 1466 that is housed within controller 100. FIG. 14 is a schematic illustration of a portion of controller 100 with housing 102 removed (a portion of housing 102 is shown in phantom) to illustrate the structural relationship between joystick 110 and magnetic actuator 112. Casing 1466 is coupled to a motor 1440 and is configured to be spun, rotated, revolved, or otherwise moved around base 1462 of joystick 110. Each magnetic actuator 112 includes a first programmable magnet 1432 attached to an outer surface of base 1462 of joystick 110 and a second programmable magnet 1438 attached to an inner surface of casing 1466 and thereby coupled to motor 1440. First and second programmable magnets 1432, 1438 are each programmable magnets including multiple magnetic elements of various strength and polarity on a single substrate.

FIG. 14 illustrates a nominal configuration of magnetic actuator 112 and joystick 110 in which no force is applied to joystick 110. First programmable magnet 1432 and second programmable magnet 1438 are programmed to attract and repel each other with a prescribed force at the same time such that joystick 110 may be magnetically "suspended" in the nominal configuration with joystick 110 protruding or extending perpendicularly away from housing 102 with a programmed spring force or damping. A user-applied force moves joystick 110 within one or more degrees of freedom, i.e., joystick 110 is physically moved forward, backwards, left or right. When the user-applied force is removed from joystick 110, the controlled or programmed spring force of magnetic actuator 112 causes first programmable magnet 1432 (and joystick 110 attached thereto) to return to their nominal configuration shown in FIG. 14.

Thus, in the nominal configuration of first and second programmable magnets 1432, 1438, the first and second programmable magnets are programmed with a controlled or programmed force or strength and a controlled or programmed spring force. Stated another way, in the nominal configuration of first and second programmable magnets 1432, 1438, the haptic effects output by magnetic actuator 112 include a programmed resistive force on joystick 110 as well as a programmed spring force of joystick 110. In order to vary or change the haptic effects output by magnetic actuator 112, casing 1466 and second programmable magnet 1438 attached thereto are spun, rotated, or otherwise moved by motor 1440 to change the position of pre-programmed pattern thereof. The re-positioned pattern of second programmable magnet 1438 changes the interaction between first and second programmable magnets 1432, 1438 and thereby results in different haptic effects being output to the user input device as described above with respect to first and second programmable magnets 432, 438, respectively. Motor 1440 is a bidirectional motor similar to motor 440 described above.

When second programmable magnet 1438 is moved between the nominal and re-positioned configurations, the haptic effects output by magnetic actuator 112 are varied or changed because the interaction between first and second programmable magnets changes and results in a different programmed resistive force on joystick 110 as well as a different programmed spring force on joystick 110. Stated another way, the pre-programmed pattern of second programmable magnet 1438 is movable relative to the pre-programmed pattern of first programmable magnet 1432 such that when second programmable magnet 1438 is in a first or nominal configuration, a first haptic effect is output to joystick 110 and when second programmable magnet 1438 is in a second or re-oriented configuration, a second haptic effect is output to joystick 110, the first and second haptic effects being different from each other. For example, when second programmable magnet 1438 is in a re-positioned configuration, the first and second programmable magnets are programmed with a controlled or programmed force or strength and a controlled or programmed spring force that are different from the strength and spring force of first and second programmable magnets 1432, 1438 when in the nominal configuration. The applied resistive force against joystick 110 may be increased or decreased, as well as the spring force of joystick 110. In an embodiment hereof, magnetic actuator 112 may output a maximum resistive force which impedes all user motion in a lock-out mode of joystick 110.

Further, in addition to a resistive force and spring force variations, a wide variety of haptic effects or sensations may be output to joystick 110 since second programmable magnet 1438 is movable relative to first programmable magnet 1432. More particularly, magnetic actuator 112 may output a detent on joystick 110 by outputting a resistive force on joystick 110 which is removed at one or more particular joystick positions or locations. As such, the detent felt by the user resembles a click. In another embodiment, magnetic actuator 112 may output texture feedback by outputting a variable or changing resistive force on joystick 110 at one or more particular button positions or locations. In yet another embodiment hereof, magnetic actuator 112 may output a vibration on joystick 110 by rapidly spinning casing 1466 and second programmable magnet 1438 attached thereto back and forth.

In an embodiment hereof, movement of casing 1466 and second programmable magnet 1438 attached thereto is initiated via detection of a movement event by position sensor 111, as described above with movement of second programmable magnet 438 and position sensor 115. In another embodiment hereof, detection of a movement event is not required for producing a haptic effect drive signal from the host computer system and movement of second programmable magnet 1438 is initiated based on programming of the host computer system.

Figure 15:
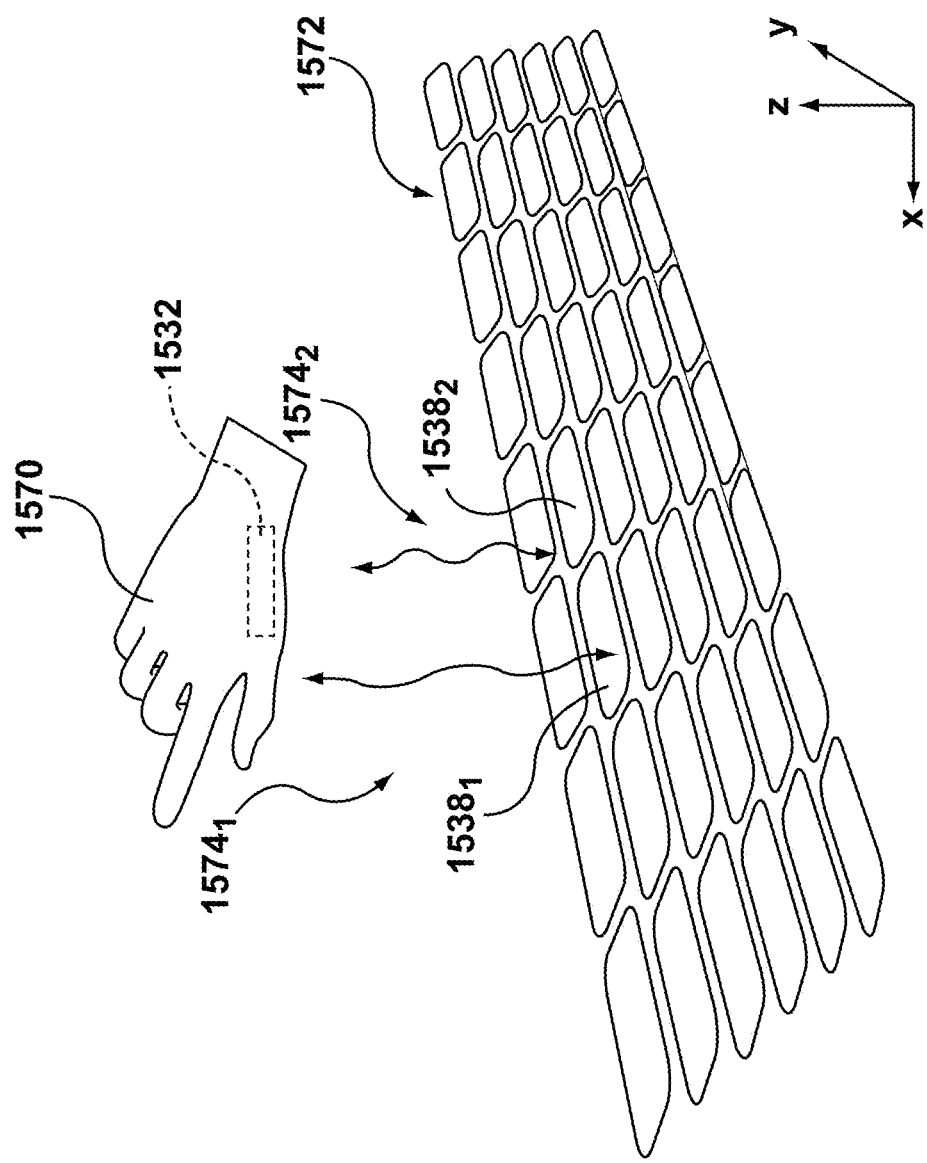
FIG. 15 is a perspective view illustration of a wearable device including at least one first programmable magnet coupled thereto according to another embodiment hereof, the wearable device being configured to interact with a surface component having a plurality of second programmable magnets attached thereto.

Magnetic actuators such as those described above for use with user input elements of a controller may be applied to other haptic applications. For example, FIG. 15 illustrates a wearable device 1570 including at least one first programmable magnet 1532 coupled thereto, the wearable device being configured to interact with surfaces or peripherals having at least one second programmable magnet attached thereto. More particularly, wearable haptic device 1570 includes at least a first programmable magnet 1532 and surface component 1572 includes a plurality of second programmable magnets 15381, 15382 and opposing pairs of the programmable magnets form or create an individual or discrete magnetic actuator 15741, 15742, respectively, with programmed or programmed characteristics. Programmable magnets 1532, 15381, 15382 are each programmable magnets including multiple magnetic elements of various strength and polarity on a single substrate.

More particularly, each magnetic actuator includes first and second programmable magnets that are programmed to attract and repel with a prescribed force at the same time such that wearable haptic device 1570 may be "suspended" magnetically above surface component 1572 such that the wearable haptic device floats above the surface component with a programmed spring force or damping. As such, magnetic actuators in accordance with embodiments hereof are configured or formed to such that wearable haptic device 1570 floats or hovers a controlled or programmed spaced-apart distance from surface component 1572 in a nominal configuration shown in FIG. 15, while also being configured to allow movement between surface component 1572 and wearable haptic device 1570 with a controlled or programmed spring force such that surface component 1572 and wearable haptic device 1570 return to the nominal configuration when no force is applied to the wearable haptic device.

As wearable haptic device 1570 is moved or translated over surface component 1572, a magnetic actuator is formed between first programmable magnet 1532 (attached to the wearable haptic device) and whichever second programmable magnet opposes or faces first programmable magnet 1532. Each magnetic actuator 15741, 15742 is configured to have programmed strength and spring force characteristics. For example, in an embodiment, when first programmable magnet 1532 is positioned to oppose or face second programmable magnet 15381, magnetic actuator 15741 may be programmed to suspend wearable haptic device 1570 a first controlled or programmed spaced-apart distance from surface component 1572 and may be programmed to allow movement between wearable haptic device 1570 and surface component 1572 with a first controlled or programmed spring force. When first programmable magnet 1532 is positioned to oppose or face second programmable magnet 15382, magnetic actuator 15742 may be programmed to suspend wearable haptic device 1570 a second controlled or programmed spaced-apart distance from surface component 1572 and may be programmed to allow movement between wearable haptic device 1570 and surface component 1572 with a second controlled or programmed spring force. The first and second controlled or programmed spaced-apart distances may be different values or may be the same, depending upon application, and the first and second controlled or programmed spring force may be different values or may be the same, depending upon application. For example, wearable haptic device 1570 and first programmable magnet 1532 thereon may be pushed away or repelled second programmable magnet 15381 and may be pulled towards or attached to second programmable magnet 15382. Although only two individual or discrete magnetic actuators 15741, 15742 are described herein, it will be understood by one of ordinary skill in the art that any number of magnetic actuators may be formed and the magnetic actuators may be configured or programmed with the same characteristics or with different characteristics as described above. In the embodiment of FIG. 15, surface component 1572 is described as a stationary component over which wearable haptic device 1570 may be moved or translated. However, in another embodiment, surface component 1572 may be re-oriented or re-positioned with a motor (not shown) in order to produce varying haptic effects.

Figure 16:
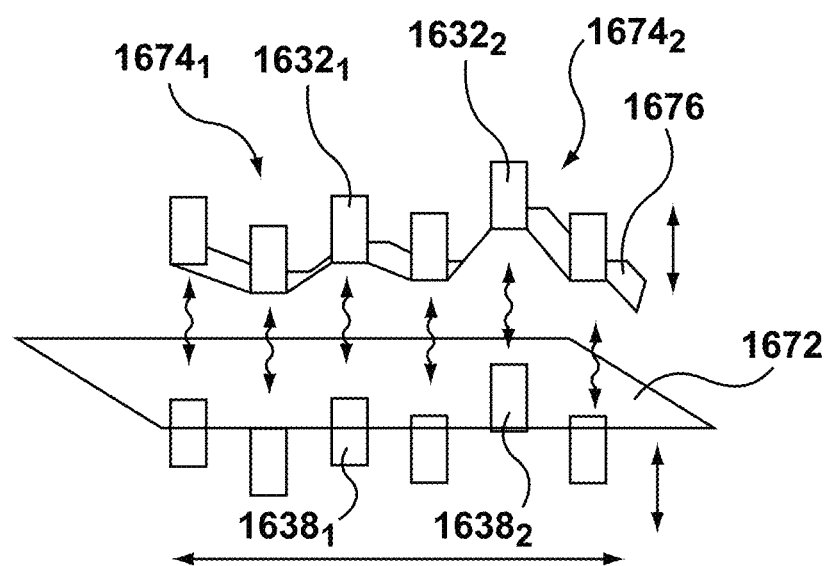
FIG. 16 is a perspective view illustration of a deformable surface including a plurality of first programmable magnets coupled thereto according to another embodiment hereof, the deformable surface being configured to interact with a surface component having a plurality of second programmable magnets coupled thereto.

Further, although wearable haptic device 1570 is shown with only one first programmable magnet, it will be understood by one of ordinary skill in the art that the haptic device may include a surface having a plurality of first programmable magnets thereon for interacting in various combinations with the plurality of second programmable magnets on surface component 1572. For example, FIG. 16 illustrates an embodiment in which a deformable surface 1676 includes a plurality of first programmable magnets 16321, 16322 coupled thereto, the deformable surface being configured to interact with a surface component 1672 having a plurality of second programmable magnets 16381, 16382 coupled thereto. Deformable surface 1676 is configured to deform or change shape due to the interaction between the respective programmable magnets coupled to deformable surface 1676 and surface component 1672. More particularly, deformable surface 1676 includes a plurality of first programmable magnets 16321, 16322 and surface component 1672 includes a plurality of second programmable magnets 16381, 16382 and opposing pairs of the programmable magnets form or create an individual or discrete magnetic actuator 16741, 16742, respectively, with programmed or programmed characteristics. Programmable magnets 16321, 16322, 16381, 16382 are each programmable magnets including multiple magnetic elements of various strength and polarity on a single substrate. Each magnetic actuator includes first and second programmable magnets that are programmed to attract and repel with a prescribed force at the same time such that deformable surface 1676 may be "suspended" magnetically above surface component 1672. The shape of configuration of deformable surface 1676 depends upon the controlled or programmed spaced-apart distance between the first and second programmable magnet for each magnetic actuator.

For example, in an embodiment, first programmable magnet 16321 is positioned to oppose or face second programmable magnet 16381, and magnetic actuator 16741 formed there-between may be programmed to suspend deformable surface 1676 a first controlled or programmed spaced-apart distance from surface component 1672. First programmable magnet 16322 is positioned to oppose or face second programmable magnet 16382, and magnetic actuator 16742 formed there-between may be programmed to suspend deformable surface 1676 a second controlled or programmed spaced-apart distance from surface component 1672. The first and second controlled or programmed spaced-apart distances may be different values or may be the same, depending upon application. Although only two individual or discrete magnetic actuators 16741, 16742 are described herein, it will be understood by one of ordinary skill in the art that any number of magnetic actuators may be formed and the magnetic actuators may be configured or programmed with the same characteristics or with different characteristics as described above. In the embodiment of FIG. 16, surface component 1672 is described as a stationary component that dictates the shape or configuration of deformable surface 1676. However, in another embodiment, surface component 1672 may be re-oriented or re-positioned with a motor (not shown) in order to vary the shape or configuration of deformable surface 1676.

In another embodiment hereof, rather than utilizing a pair of opposing programmable magnets, magnetic actuators according to embodiment hereof may utilize a first programmable magnet with an electromagnet in order to output varying haptic effects. Similar to the way in which a second programmable magnet is moved in order to vary haptic effects, an electromagnet may be selectively turned on and off in order to vary haptic effects.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. For example, magnetic actuators according to embodiment hereof are not limited to the user input elements specifically described, i.e., buttons, triggers, and joysticks, but may also be applied to other user input elements including wheel-type elements. In addition, although controller 100 is shown and described herein with magnetic actuators for all three types of user input elements, i.e., buttons, triggers, and joysticks, a magnetic actuator according to an embodiment hereof may be used in a controller for one or more user input elements while other haptic actuators known in the art may be utilized to provide haptic effects to other user input elements of the controller. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic-enabled user interface controller comprising:
   a body;
   a plurality of magnetic elements and at least one electromagnet that are coupled to the body and are configured to generate a haptic effect by being disposed to generate at least one of an attractive force and a repelling force on each other when the at least one electromagnet is activated; and
   a processor configured to activate the at least one electromagnet in response to a determination to output the haptic effect,
   wherein the plurality of magnetic elements are coupled to a first surface of the controller, and the at least one electromagnet is coupled to a second surface of the controller, wherein the first surface is spaced from the second surface.

2. The haptic-enabled user interface controller of claim 1, wherein the plurality of magnetic elements and the at least one electromagnet are disposed to face each other.

3. The haptic-enabled user interface controller of claim 1, wherein the plurality of magnetic elements and the at least one electromagnet are configured to output the haptic effect based on a simulated texture.

4. The haptic-enabled user interface controller of claim 1, wherein the haptic effect that is output by the plurality of magnetic elements and the at least one electromagnet includes a vibration.

5. The haptic-enabled user interface controller of claim 1, wherein, when the at least one electromagnet is activated, the plurality of magnetic elements and the at least one electromagnet are configured to exert a force on each other that impedes motion of a portion of the controller.

6. A wearable haptic-enabled user interface device, comprising:
   a plurality of magnetic elements and at least one electromagnet that are configured to generate a haptic effect at the user interface device by being disposed to generate at least one of an attractive force and a repelling force on each other when the at least one electromagnet is activated; and
   a processor configured to activate the at least one electromagnet in response to a determination to output the haptic effect,
   wherein the plurality of magnetic elements are coupled to a first surface, and the at least one electromagnet is coupled to a second surface, wherein the first surface is spaced from the second surface.

7. The wearable haptic-enabled user interface device of claim 6, wherein the device is a glove.

8. The wearable haptic-enabled user interface device of claim 6, wherein the first surface and the second surface are opposing surfaces.

9. The wearable haptic-enabled user interface device of claim 8, wherein at least one magnetic element of the plurality of magnetic elements and the at least one electromagnet are disposed to face each other.

10. The wearable haptic-enabled user interface device of claim 6, wherein the first surface is a deformable surface of the user interface device, and wherein the plurality of magnetic elements are configured to deform the deformable surface when the at least one electromagnet is activated.

11. The wearable haptic-enabled user interface device of claim 10, wherein the deformable surface is an outer surface of the user interface device.

12. The wearable haptic-enabled user interface device of claim 6, wherein the plurality of magnetic elements and the at least one electromagnet are configured to output the haptic effect based on a simulated texture.

13. The wearable haptic-enabled user interface device of claim 6, wherein the haptic effect that is output by the plurality of magnetic elements and the at least one electromagnet includes a vibration.

14. The wearable haptic-enabled user interface device of claim 6, wherein the haptic effect that is output by the plurality of magnetic elements and the at least one electromagnet includes a detent.

15. The wearable haptic-enabled user interface device of claim 6, wherein the plurality of magnetic elements and the at least one electromagnet are configured to output the haptic effect based on a simulated click of a button or trigger.

16. The wearable haptic-enabled user interface device of claim 6, wherein, when the at least one electromagnet is activated, the plurality of magnetic elements and the at least one electromagnet are configured to exert a force on each other that impedes motion of a portion of the user interface device.

17. The wearable haptic-enabled user interface device of claim 6, wherein the plurality of magnetic elements have the same strength and polarity.

18. The wearable haptic-enabled user interface device of claim 6, wherein at least two magnetic elements of the plurality of magnetic elements have different polarities or different magnetic strengths.

19. The wearable haptic-enabled user interface device of claim 6, wherein the haptic effect is based on an event in a virtual environment.

20. The wearable haptic-enabled user interface device of claim 6, further comprising:
a position sensor, wherein the processor is configured to detect a movement event based on data from the position sensor, and wherein the processor is configured to cause the haptic effect based on the movement event.

21. A deformable surface of an object, the deformable surface comprising:
a plurality of magnetic elements for causing deformation of the deformable surface, wherein the plurality of magnetic elements are configured to experience a repelling force or an attractive force from at least one electromagnet, and wherein the plurality of magnetic elements are configured to change a shape of the deformable surface when the at least one electromagnet is activated to exert the attractive force or the repelling force on the plurality of magnetic elements.

22. The deformable surface of claim 21, wherein the at least one electromagnet is disposed on a surface that is spaced from the deformable surface.

23. The deformable surface of claim 21, wherein the deformable surface is part of a wearable device.

24. The deformable surface of claim 21, wherein the deformable surface comprises a first layer, and the plurality of magnetic elements are coupled to the first layer of the deformable surface.

* * * * *